(12) United States Patent
Mainiero

(10) Patent No.: US 12,320,281 B2
(45) Date of Patent: Jun. 3, 2025

(54) CATCH CAN SYSTEM AND METHOD

(71) Applicant: Joe Mainiero, Lake Worth, FL (US)

(72) Inventor: Joe Mainiero, Lake Worth, FL (US)

(*) Notice: Subject to any disclaimer, the term of this patent is extended or adjusted under 35 U.S.C. 154(b) by 405 days.

(21) Appl. No.: 18/088,930

(22) Filed: Dec. 27, 2022

(65) Prior Publication Data
US 2024/0209760 A1    Jun. 27, 2024

(51) Int. Cl.
| | | |
|---|---|---|
| *F01M 13/04* | (2006.01) | |
| *B01D 46/00* | (2022.01) | |
| *B01D 46/10* | (2006.01) | |
| *B01D 46/24* | (2006.01) | |
| *B01D 46/64* | (2022.01) | |

(52) U.S. Cl.
CPC ......... *F01M 13/04* (2013.01); *B01D 46/0005* (2013.01); *B01D 46/0031* (2013.01); *B01D 46/10* (2013.01); *B01D 46/24* (2013.01); *B01D 46/64* (2022.01); *B01D 2265/029* (2013.01); *B01D 2271/027* (2013.01); *F01M 2013/0438* (2013.01)

(58) Field of Classification Search
CPC .............. B01D 46/003; B01D 46/0031; B01D 46/525–527; B01D 2265/029; B01D 46/0005; B01D 46/24–2498; B01D 2271/027; F02M 13/04; F02M 2013/0438
See application file for complete search history.

(56) References Cited

U.S. PATENT DOCUMENTS 4,409,005 A * 10/1983 McKendrick ........ B01D 53/266
137/203
5,409,514 A * 4/1995 Ragusa .............. B01D 46/0043
55/319

FOREIGN PATENT DOCUMENTS

WO    WO-2016186213 A1 * 11/2016 ............. B01D 46/00

* cited by examiner

*Primary Examiner* — Robert Clemente
(74) *Attorney, Agent, or Firm* — Uradnik Law Firm PA

(57) ABSTRACT

An oil and air separator includes a lower housing defining in part a chamber within which oil may collect; an upper housing including a lower end threadingly engaged to an upper end of the lower housing; and a filter assembly threadingly engaged to the upper housing; wherein a lower portion of the filter assembly is disposed within the chamber when the filter assembly is threadingly engaged to the upper housing and the upper housing is threadingly engaged to the lower housing; wherein the filter assembly includes a filter block including a plurality of parallel lumens extending through the block; and wherein a continuous fluid pathway exists through the oil and air separator, the continuous fluid pathway extending from a fluid inlet port disposed in the upper housing, downward through a first passageway about the filter assembly, into the chamber, through a lower end of the filter assembly, upward through the plurality of parallel lumens extending through the filter block, through an upper end of the filter assembly, and through a second passageway leading to a fluid outlet port disposed in the upper housing.

5 Claims, 5 Drawing Sheets

CATCH CAN SYSTEM AND METHOD

FIELD OF THE DISCLOSURE

The invention relates generally to the removal of crankcase oil from one or more exit airstreams from a crankcase of an internal combustion engine, and more particularly to the use of an oil and air separator or catch can including a filter component including a plurality of parallel fluid channels.

BACKGROUND

In a combustion engine, blow-by gases typically include unburned gasoline. That is, an amount of air and unburned gasoline from the engine cylinder is pulled past the piston rings and into the crankcase.

In one instance, blow-by gases might be exhausted to the atmosphere through a breather system coupled directly to an engine oil fill port. See FIG. 1. In another instance, instead of exhausting blow-by gases to the atmosphere, a positive crankcase ventilation (PCV) system recycles the blow-by gases through a PCV valve into the engine's intake manifold. Such recycling occurs when the engine is operating at relatively slow speeds (e.g. idling), i.e., when the air pressure in the crankcase is higher than the air pressure in the intake manifold.

One problem associated with breather systems and PCV systems and their use involves oil vapors. An engine's crankcase is used to store oil. A pan located below the crankshaft holds oil, and generally oil vapors from the oil in the pan may find their way into the blow-by gases.

In a combustion engine, crankcase breathers have been used as a replacement for an engine oil fill cap. A crankcase breather creates a fluid pathway for engine combustion gases to travel through the engine oil fill port and through the crankcase breather to the atmosphere. The crankcase breather may include a means for filtering oil from the combustion gases. However, a problem exists in that the top filter means allows oil to blow all over in the engine bay, creating a huge mess. Control of the oil from the exhaust gases is unmanageable. There is no way to prevent the escape of oil to the environment, and no way to prevent oil undesirable oil dripping (e.g., onto driveways, garage floors)

It is also undesirable for oil to be recycled with blow-by gases into an engine's intake manifold. Such recycled oil may degrade engine performance by lowering the overall octane of the combustion mixture in a cylinder. Such recycled oil also may coat the air intake and prevent airflow. To help combat the presence of oil in blow-by gases, "dirty-side" oil and air separators were developed to remove the oil from the blow-by gases before recirculation through the PCV valve and into the intake manifold. However, when the air pressure in the crankcase is higher than the air pressure in the intake manifold, it is also possible that blow-by gases will travel upstream (or backwards) into the "clean-side" assembly that leads from the PCV valve to the intake manifold.

There are various different models or types of oil and air separators available. One popular type of oil and air separator involves passing oily blow-by gases through a filter material. The oil collects in droplets on the filter material, which may be held in place by a screen. The oil is allowed to drop into the bottom of a can where the oil collects for later removal. This "can approach" to oil and air separation is not without its drawbacks, however.

SUMMARY

The present disclosure provides oil and air separation systems and methods. In one exemplary embodiment, an oil and air separator includes: a lower housing defining in part a chamber within which oil may collect: an upper housing including a lower end threadingly engaged to an upper end of the lower housing: and a filter assembly threadingly engaged to the upper housing: wherein a lower portion of the filter assembly is disposed within the chamber when the filter assembly is threadingly engaged to the upper housing and the upper housing is threadingly engaged to the lower housing: wherein the filter assembly includes a filter block including a plurality of parallel lumens extending through the block; and wherein a continuous fluid pathway exists through the oil and air separator, the continuous fluid pathway extending from a fluid inlet port disposed in the upper housing, downward through a first passageway about the filter assembly, into the chamber, through a lower end of the filter assembly, upward through the plurality of parallel lumens extending through the filter block, through an upper end of the filter assembly, and through a second passageway leading to a fluid outlet port disposed in the upper housing.

Other benefits and advantages of the present disclosure will be appreciated from the following detailed description.

DETAILED DESCRIPTION

Figure 1:
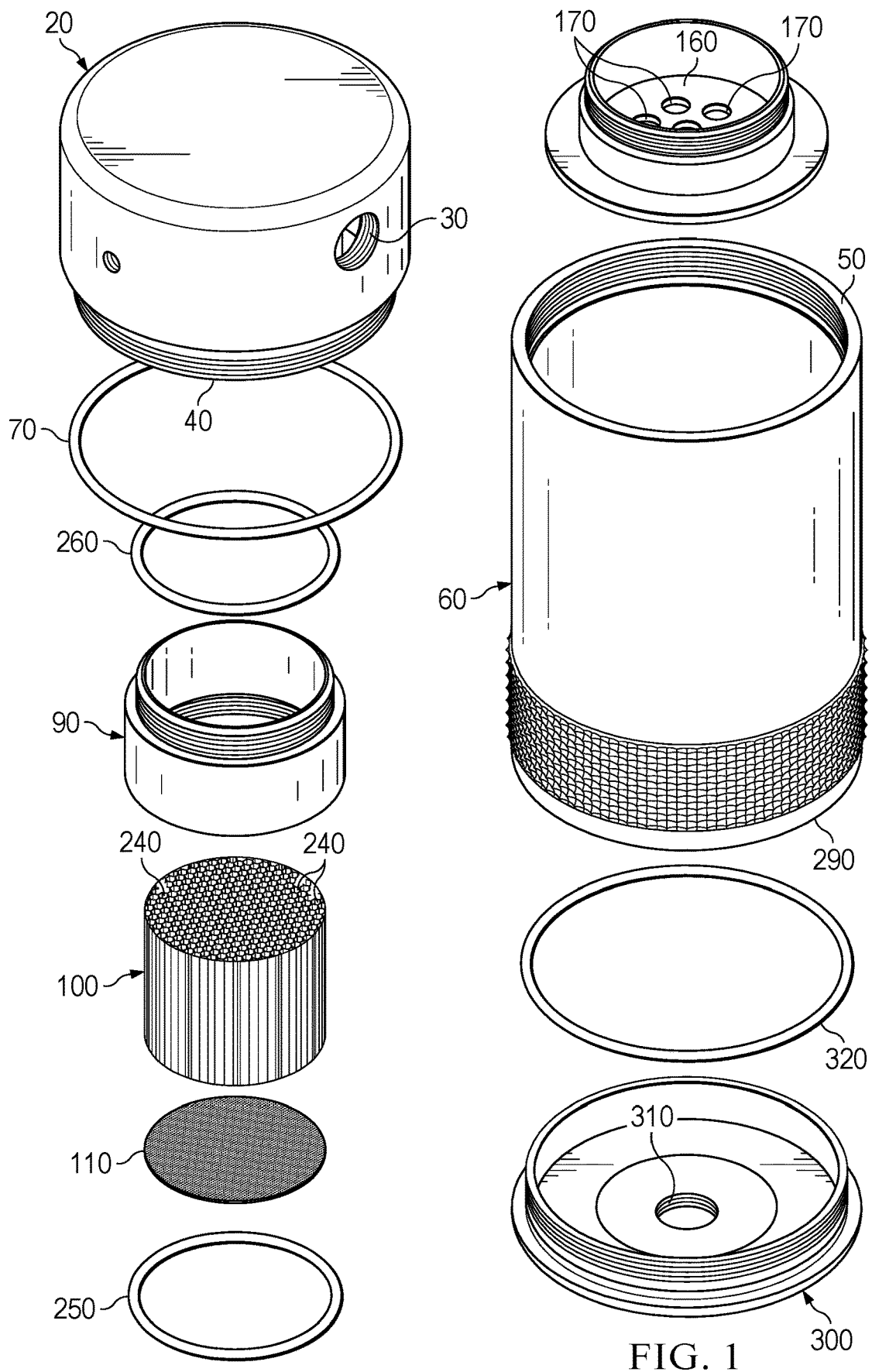
FIG. 1 is an exploded, perspective view from above of an exemplary oil and air separator.

Embodiments of the invention and various alternatives are described. Those skilled in the art will recognize, given the teachings herein, that numerous alternatives and equivalents exist which do not depart from the invention. It is therefore intended that the invention not be limited by the description set forth herein or below.

One or more specific embodiments of the system and method will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Further, for clarity and convenience only, and without limitation, the disclosure (including the drawings) sets forth exemplary representations of only certain aspects of events and/or circumstances related to this disclosure. Those skilled in the art will recognize, given the teachings herein, additional such aspects, events and/or circumstances related to this disclosure, e.g., additional elements of the devices described; events occurring related to oil and air separation; etc. Such aspects related to this disclosure do not depart from the invention, and it is therefore intended that the invention not be limited by the certain aspects set forth of the events and circumstances related to this disclosure.

The present disclosure in one embodiment provides an oil and air separator in fluid communication with an exit airstream from a combustion engine crankcase. As shown in the FIGS. 1-5, the oil and air separator 10 includes an upper housing 20 including an inlet port 30 that is in fluid communication with the exit airstream from a combustion engine crankcase. The lower end 40 of upper housing 20 threadingly engages with the upper end 50 of lower housing 60. The upper housing 20 and lower housing 60 thus are removably coupled to each other. A first o-ring 70 may be disposed between the upper housing 20 and lower housing 60 to provide a seal to prevent the escape of fluids from the oil and air separator 10.

Figure 2:
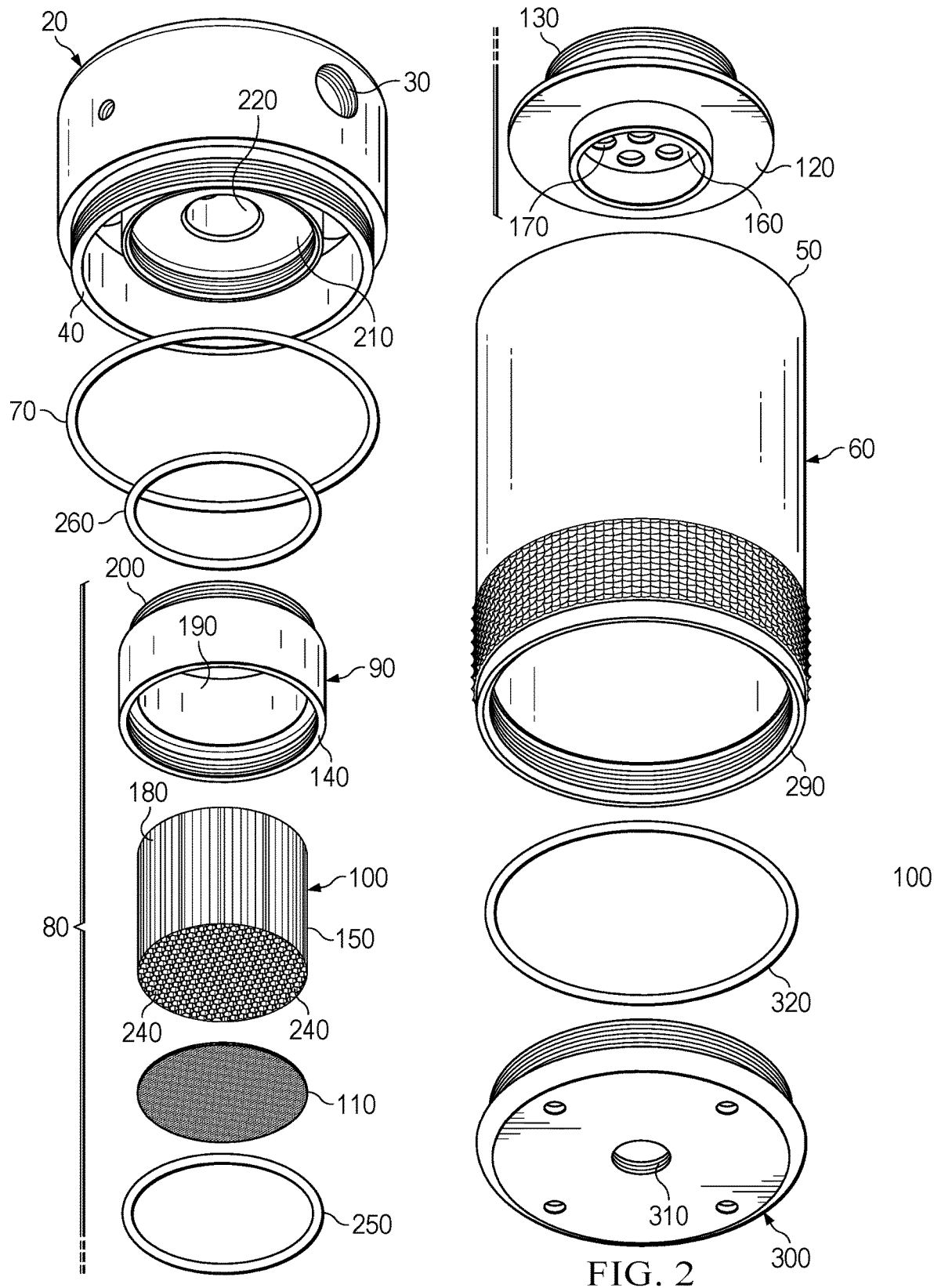
FIG. 2 is an exploded, perspective view from below of the exemplary oil and air separator shown in FIG. 1.
Figure 3:
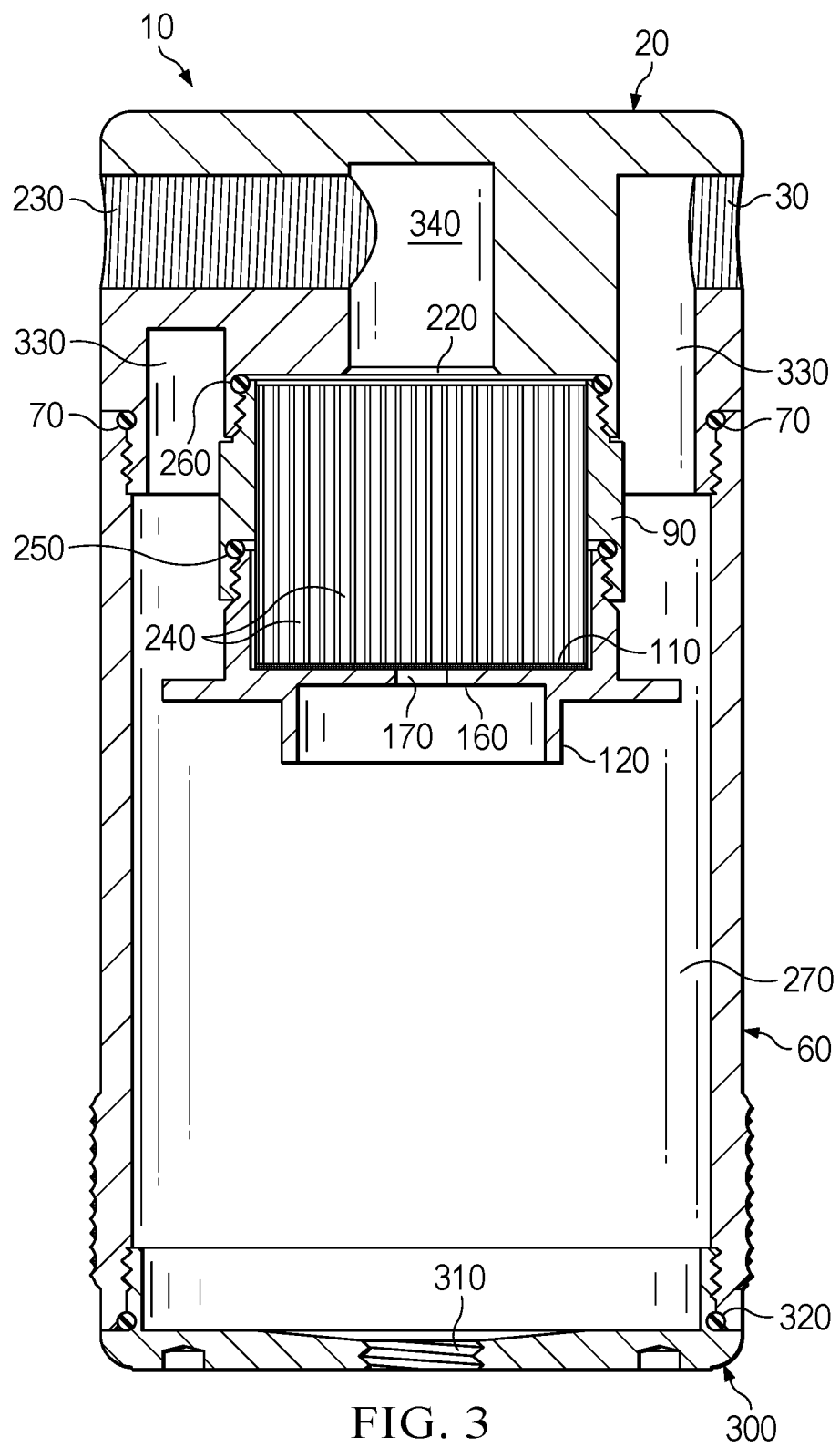
FIG. 3 is a cross-sectional view of the assembled oil and air separator shown in FIG. 1.
Figure 4:
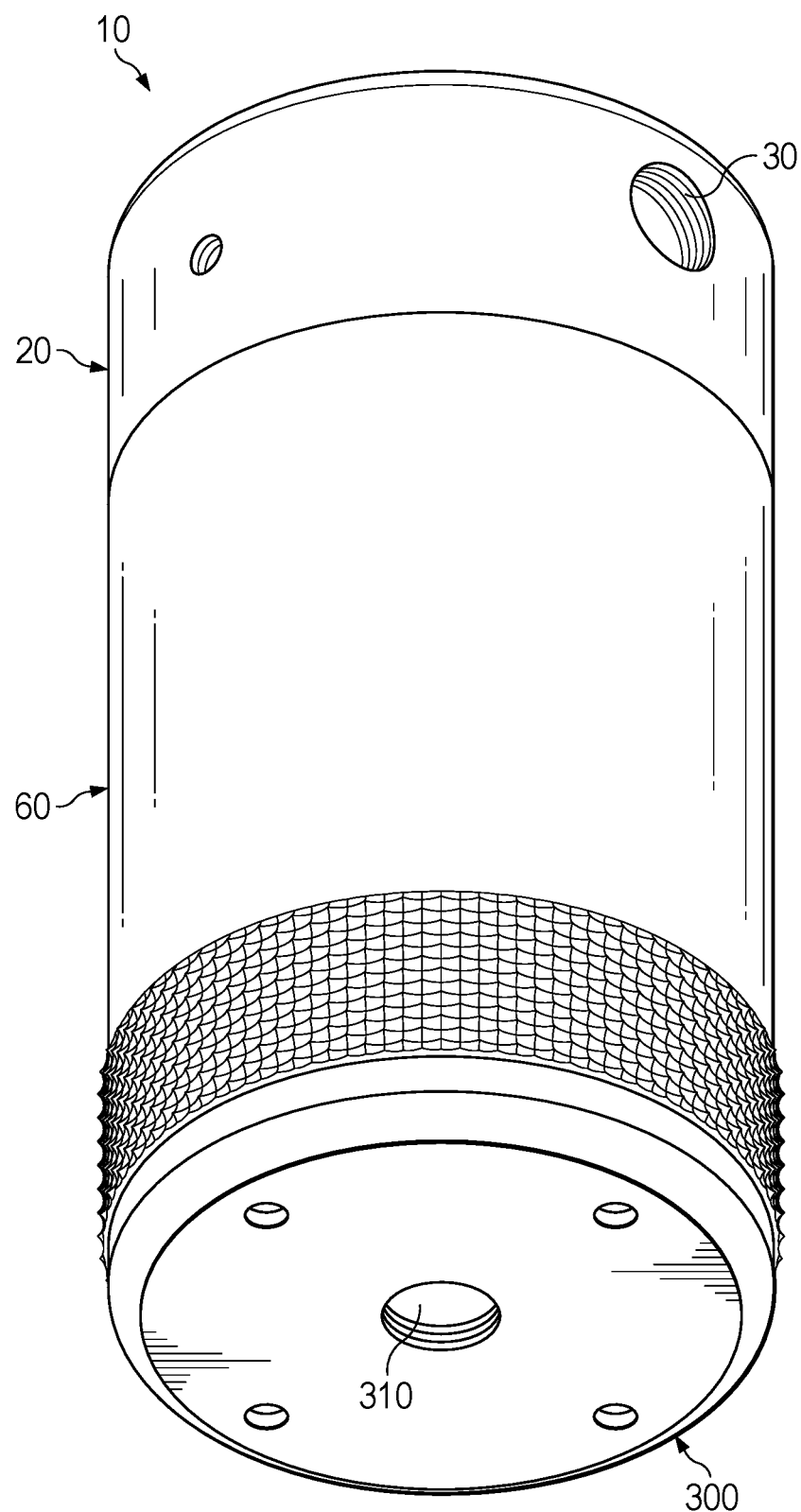
FIG. 4 is a perspective view from below of the assembled oil and air separator shown in FIG. 1.
Figure 5:
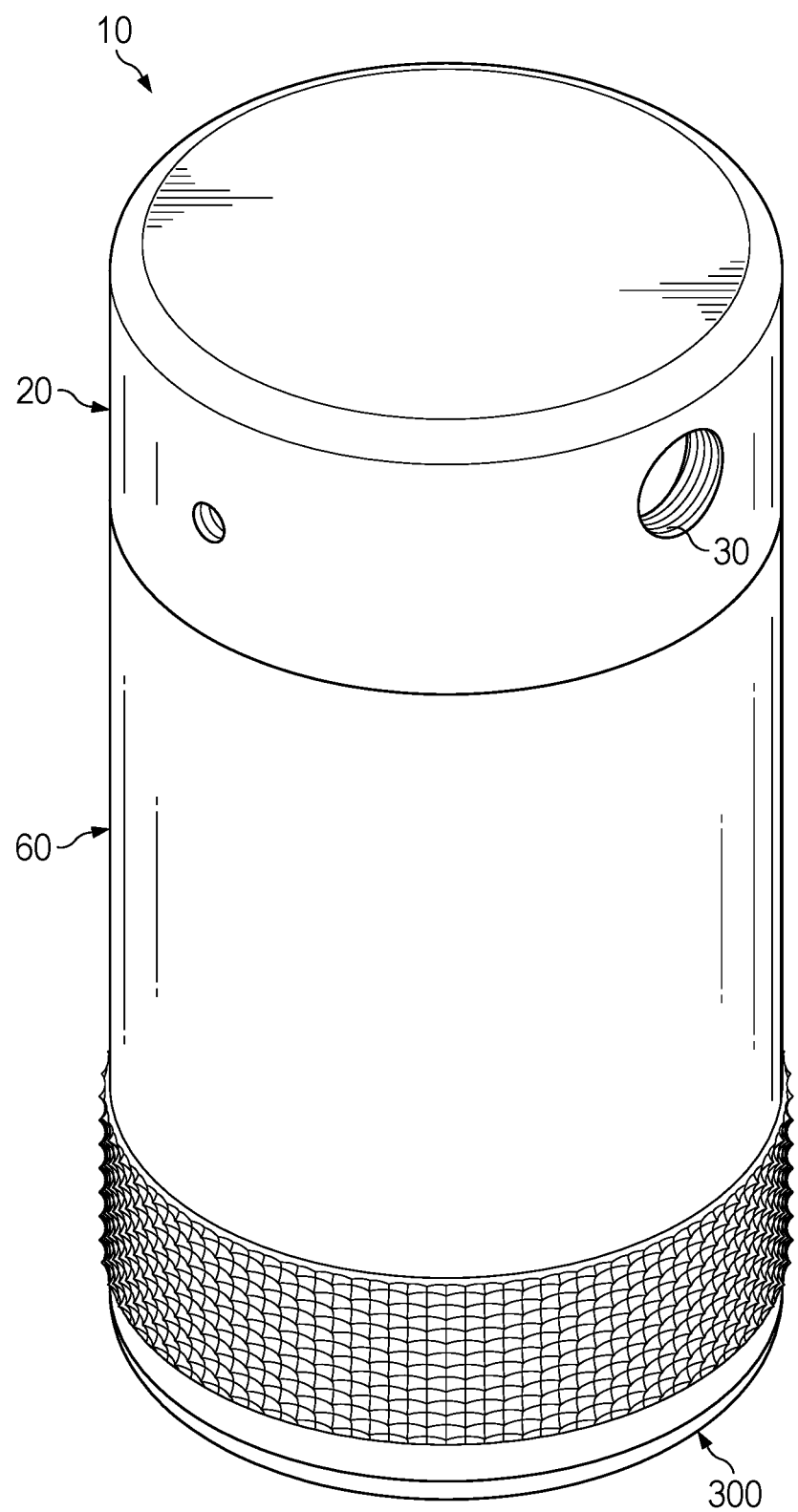
FIG. 5 is a perspective view from above of the assembled oil and air separator shown in FIG. 1.

A filter assembly 80 includes a collar 90, a filter block 100, a screen 110, and a lower cap 120. The upper end 130 of lower cap 120 threadingly engages with the lower end 140 of collar 90. A lower portion 150 of filter block 100 is disposed within lower cap 120, with the screen 110 between the lower portion 150 of filter block 100 and a bottom plate 160 of lower cap 120. As shown in FIGS. 1-3, the bottom plate 160 includes a plurality of holes 170.

An upper portion 180 of filter block 100 is disposed in a lumen 190 through collar 90. In one embodiment, the upper end 200 of collar 90 includes a shoulder extending into the lumen 190 about its periphery, to prevent any upward movement of the filter block 100 out of the upper end 200 of collar 90. In another embodiment, the upper portion 180 of filter block 100 seats against a surface 210 formed in the upper housing 20, the surface 210 including a port 220 that is in fluid communication with an outlet port 230 of oil and air separator 10.

The filter block 100 includes a plurality of parallel lumens 240 therethrough. In one embodiment, the lumens 240 have a circular cross-section. In another embodiment, the lumens 240 have a hexagonal cross-section. In other embodiments the cross-section of the lumens have a cross-section with a different geometry. Each lumen 240 may be approximately the same size and shape in diameter. In an alternate embodiment, some lumens 240 may vary in diameter and/or shape.

As shown in the FIGS. 1-3, a second o-ring 250 may be disposed between the upper end 130 of lower cap 120 and the lower end 140 of collar 90. When the filter block 100 is positioned within the filter assembly 80, the upper end 200 of collar 90 threadingly engages with upper housing 20 at surface 210. A third o-ring 260 may be disposed between the upper housing 20 and the upper end 200 of collar 90.

The lower housing 60 defines in part a chamber 270 disposed within the interior of lower housing 60. When the filter assembly 80 is threadingly engaged with the upper housing 20 and the upper housing 20 is threadingly engaged with the upper end 280 of lower housing 60, a portion of the filter assembly 80 extends downwardly into the chamber 270. The lower end 290 of lower housing 60 may threadingly engage with a clean-out cap 300. The clean-out cap 300 may include an oil exit port 310 through which oil that gathers in the chamber 270 may be removed. In one embodiment, a petcock or valve may be positioned at oil exit port 310 to allow the selective opening and closing of the oil exit as desired. A fourth o-ring 320 may provide a seal between the lower housing 60 and the clean-out cap 300.

In operation, the oil and air separator 10 includes a continuous fluid pathway from inlet port 30, through filter assembly 80, and to outlet port 230. Air entrained with oil enters the inlet port 30 and passes through an annular space 330 formed in upper housing 20. The fluid passes around the filter assembly 80 and into the chamber 270. From there, the fluid passes upwardly through the holes 170 in the bottom plate 160 of lower cap 120. The fluid then passes through the screen 110 and through the plurality of lumens 240 in filter block 100. Exiting the filter block 100, the fluid then passes through the port 220 in surface 210 of upper housing 20, and proceeds out the outlet port 230 of oil and air separator 10 via passageway 340.

As the oily fluid passes through the oil and air separator 10, oil droplets coalesce on the various surfaces of the components that make up the continuous fluid pathway through the device. The oil then travels due to gravity into the chamber 270, where the oil may be removed as desired via oil exit port 310. The result is an exit fluid stream from outlet port 230 that includes little or no oil.

It should be understood that the foregoing description is only illustrative of the invention. Various alternatives and modifications can be devised by those skilled in the art having the benefit of this disclosure, without departing from the invention. Accordingly, the invention is intended to embrace all such alternatives, modifications and variances.

Certain exemplary embodiments of the disclosure may be described. Of course, the embodiments may be modified in form and content, and are not exhaustive, i.e., additional aspects of the disclosure, as well as additional embodiments, will be understood and may be set forth in view of the description herein. Further, while the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention.

What is claimed is:

1. An oil and air separator including:
   (a) a lower housing defining in part a chamber within which oil may collect;
   (b) an upper housing including a lower end threadingly engaged to an upper end of the lower housing; and
   (c) a filter assembly threadingly engaged to the upper housing;
   wherein a lower portion of the filter assembly is disposed within the chamber when the filter assembly is threadingly engaged to the upper housing and the upper housing is threadingly engaged to the lower housing;
   wherein the filter assembly includes a filter block including a plurality of parallel lumens extending through the block; and
   wherein a continuous fluid pathway exists through the oil and air separator, the continuous fluid pathway extending from a fluid inlet port disposed in the upper housing, downward through a first passageway about the filter assembly, into the chamber, through a lower end of the filter assembly, upward through the plurality of parallel lumens extending through the filter block, through an upper end of the filter assembly, and through a second passageway leading to a fluid outlet port disposed in the upper housing.

2. An oil and air separator including:
(a) a lower housing defining in part a chamber within which oil may collect;
(b) an upper housing including a lower end threadingly engaged to an upper end of the lower housing; and
(c) a filter assembly threadingly engaged to the upper housing;

wherein a lower portion of the filter assembly is disposed within the chamber when the filter assembly is threadingly engaged to the upper housing and the upper housing is threadingly engaged to the lower housing;

wherein the filter assembly includes a filter block including a plurality of parallel lumens extending through the block;

wherein a continuous fluid pathway exists through the oil and air separator, the continuous fluid pathway extending from a fluid inlet port disposed in the upper housing, downward through a first passageway about the filter assembly, into the chamber, through a lower end of the filter assembly, upward through the plurality of parallel lumens extending through the filter block, through an upper end of the filter assembly, and through a second passageway leading to a fluid outlet port disposed in the upper housing; and wherein the filter assembly includes a collar threadingly engaged to the upper housing at an upper end of the collar and a lower cap threadingly engaged to the collar at a lower end of the collar.

3. The oil and air separator of claim 2, wherein a first portion of the filter block is disposed within the collar and a second portion of the filter block is disposed within the lower cap.

4. The oil and air separator of claim 3, wherein a screen is disposed between the filter block and the lower cap.

5. The oil and air separator of claim 4, wherein the chamber is in fluid communication with an oil exit port through which oil may be removed from the chamber.

* * * * *